(No Model.) 4 Sheets—Sheet 1.

G. H. PERKINS.
DEVICE FOR TESTING THE PHYSICAL CONDITION OF LIQUIDS AT GIVEN TEMPERATURES.

No. 383,980. Patented June 5, 1888.

Witnesses
F. Norman Dixon,
Lewis Altmier.

George H. Perkins
Inventor
By his Attorneys,
Wm. C. Strawbridge
J. Bonsall Taylor (No Model.) 4 Sheets—Sheet 2.
G. H. PERKINS.
DEVICE FOR TESTING THE PHYSICAL CONDITION OF LIQUIDS AT GIVEN TEMPERATURES.
No. 383,980. Patented June 5, 1888.
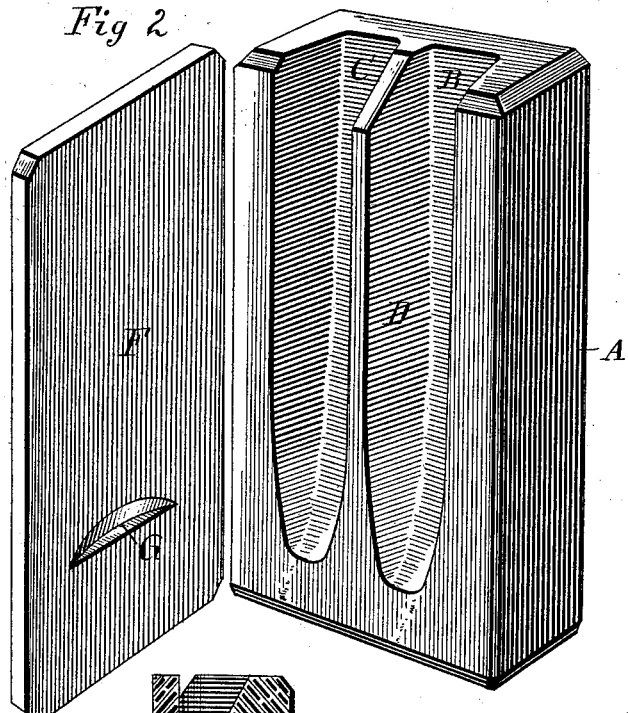
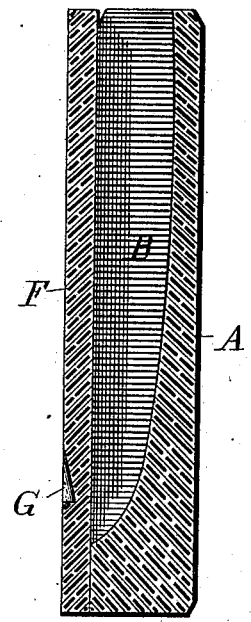
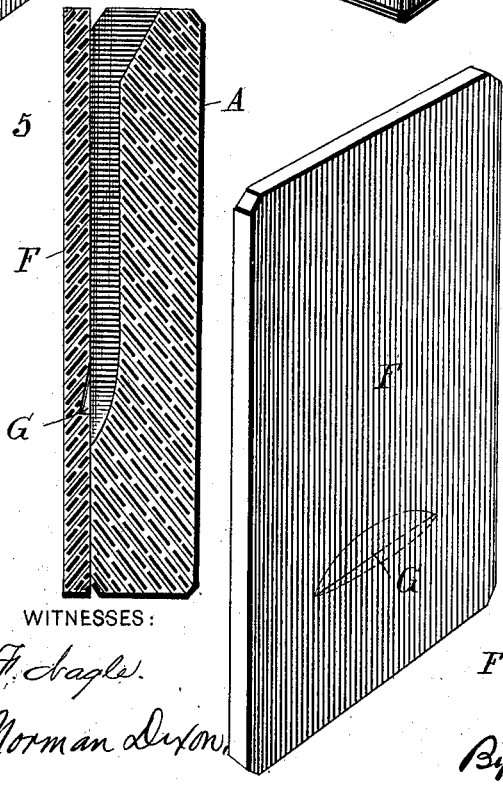

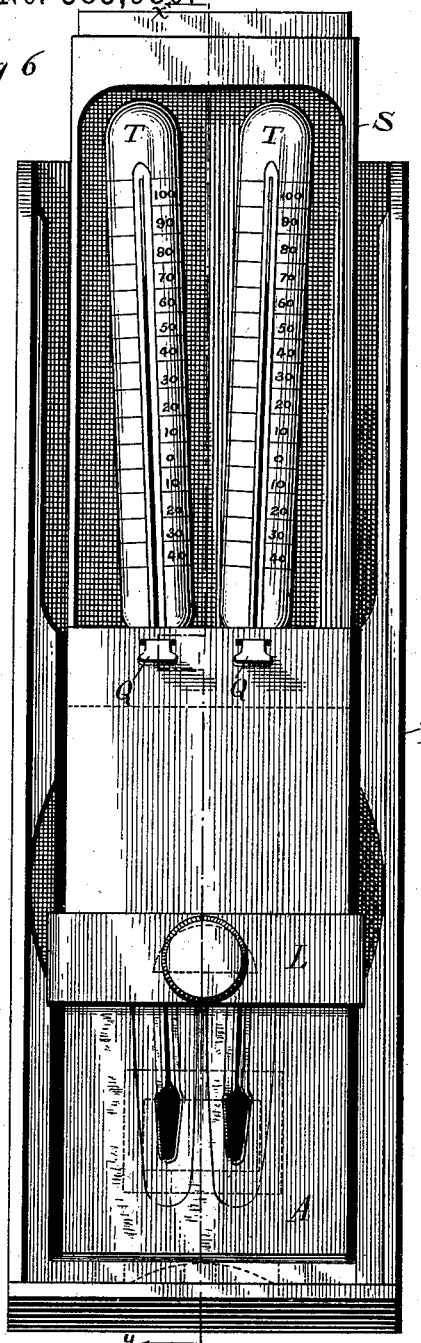
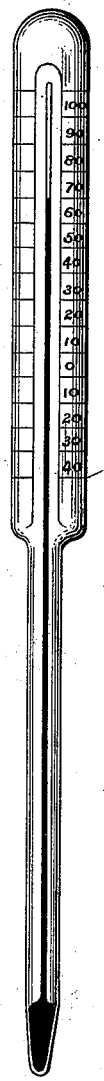
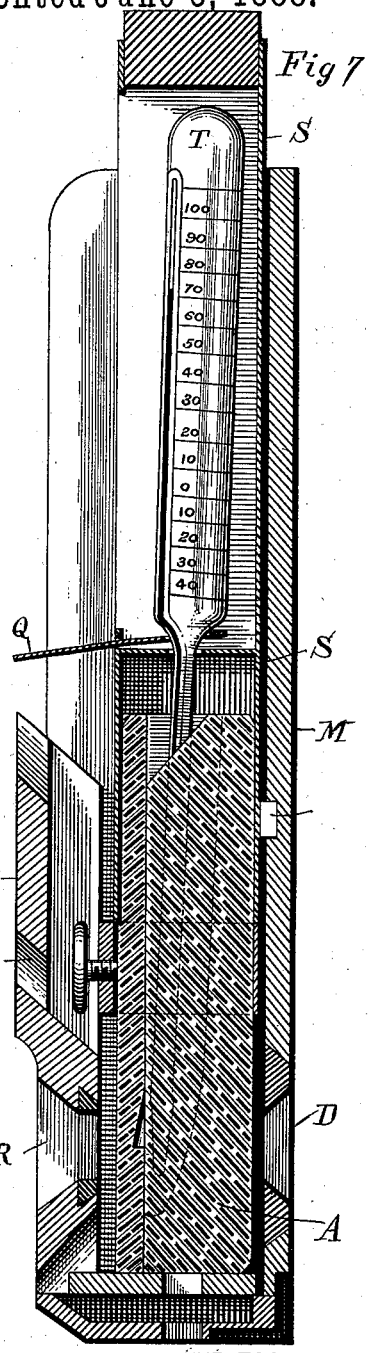

(No Model.) 4 Sheets—Sheet 4.

G. H. PERKINS.
DEVICE FOR TESTING THE PHYSICAL CONDITION OF LIQUIDS AT GIVEN TEMPERATURES.

No. 383,980. Patented June 5, 1888.

WITNESSES:
O. F. Nagle.
F. Norman Dixon.

George H. Perkins
INVENTOR
By his Attorneys,
Wm. C. Strawbridge,
Bonsall Taylor.

UNITED STATES PATENT OFFICE.

GEORGE H. PERKINS, OF PHILADELPHIA, PENNSYLVANIA.

DEVICE FOR TESTING THE PHYSICAL CONDITION OF LIQUIDS AT GIVEN TEMPERATURES.

SPECIFICATION forming part of Letters Patent No. 383,980, dated June 5, 1888.

Application filed July 25, 1887. Serial No. 245,159. (No model.)

*To all whom it may concern:*

Be it known that I, GEORGE H. PERKINS, a citizen of the United States, residing in the city and county of Philadelphia in the State of Pennsylvania, have invented a Device for Testing the Physical Condition of Oil and Other Liquids at Given Temperatures, of which the following is a specification.

Hitherto it has been difficult, if not impossible, to accurately determine the exact temperatures of liquids at which certain physical conditions exist, by reason of the fact that in the use of the apparatus employed for the purpose the temperatures of the materials tested, at the point of observation, varied from the temperature of said materials at the bulb of the thermometer with which the test was made, this result being due to the fact that the liquids tested were contained in vessels in which changes of temperature quickly and irregularly occurred and through which heat was rapidly conveyed to said liquids.

The object of my invention is to provide a device in which the liquid to be tested may be contained during the operation, and in which it will be but slowly acted upon by heat, and it consists as hereinafter described and claimed.

Figure 1:
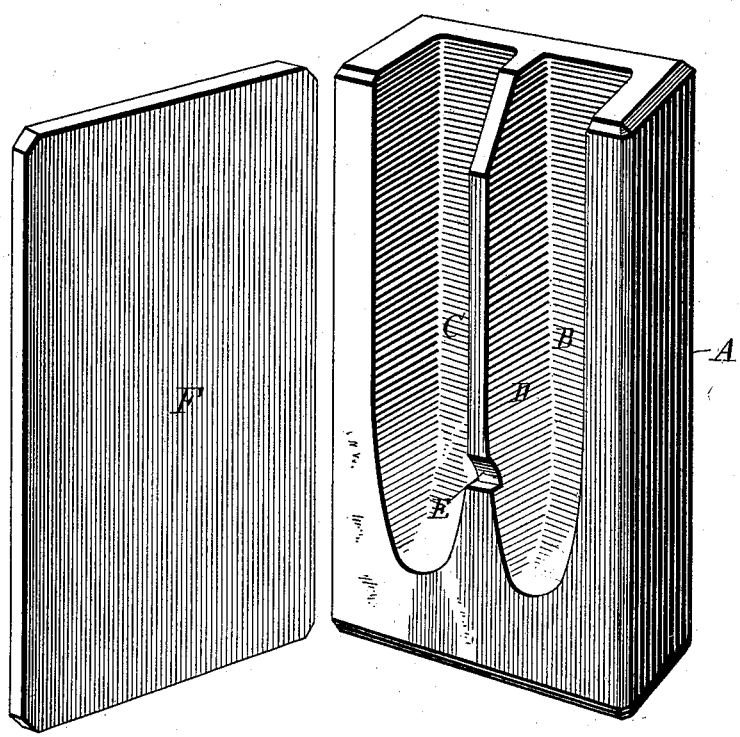
Figure 9:
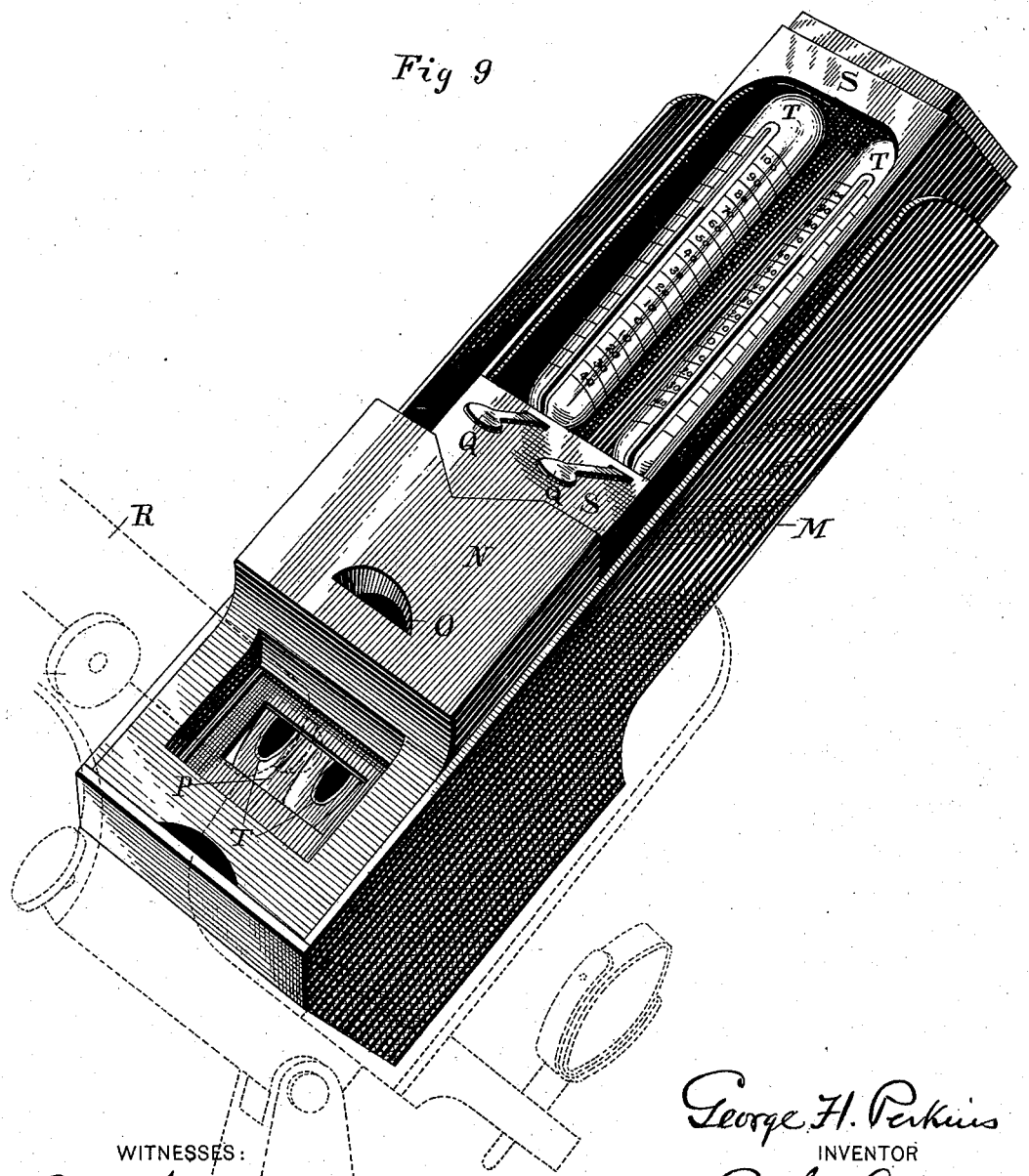

In the drawings, Figure 1 is a perspective view of a block of glass provided with two parallel longitudinal bores, a communicating channel connecting them, and a lid or cover. Fig. 2 is a perspective view of a block of glass, provided with two parallel longitudinal bores, and a lid or cover provided on one side with a transverse channel. Fig. 3 is a central sectional elevation through one of the bores of the device shown in Fig. 2. Fig. 4 is a view in perspective of a block of glass provided with three parallel longitudinal grooves, and a cover or lid provided on one side with a transverse channel. Fig. 5 is a central sectional elevation through the middle longitudinal groove of the device shown in Fig. 4. Fig. 6 is a front elevation of an apparatus embodying my invention. Fig. 7 is a sectional elevation, on the line *x y* of Fig. 6, sight being taken in the direction of the arrows thereon. Fig. 8 is a front elevation of one of the thermometers employed in said apparatus. Fig. 9 is a perspective view of my device, illustrating in connection therewith in dotted lines, a microscope and a device for polarizing light.

Similar letters of reference indicate corresponding parts.

My invention, generally stated, consists in the employment of a transparent glass block provided with one or more vertical bores for containing the liquid to be tested and for receiving the bulb of a thermometer,—the walls of said block being of such thickness as to prevent a rapid change of the temperature of said block and of the liquid tested.

Various forms and constructions of blocks are shown in the drawings.

In Fig. 1 the transparent glass block A is provided with two vertical parallel grooves B and C, separated by a partition or bridge D,— said partition having a channel or duct E, which, when the plate F is in place upon the face of the block, affords means for the flow of the liquid tested to and fro between the channels B and C.

In Fig. 2 the block A is provided with channels B and C, and with a bridge or partition D, (the channel E of Fig. 1 being omitted therefrom,) and a lid or plate F provided with a transverse slot or channel G.

In Fig. 4 the block A is provided with vertical parallel channels B and C, and with an intermediate or middle channel H,—these channels being separated by bridges or partitions J K, and the plate or lid F being provided with a transverse groove or channel G.

The object of the channel E, in the bridge of the block shown in Fig. 1, and of the channels G G, in the covers of the blocks shown in Figs. 2 and 4, is the same, namely, to permit of the circulation of the liquids contained in said channels from one channel to the other, and to thus insure uniformity of temperature throughout the liquid tested.

Should it be desired to make a test of two liquids, for the purpose of comparing them, this may be done by the use of the block shown in Fig. 2, by applying the plate or lid F so as as to have it present its flat or ungrooved face to the block when in place thereon, as shown in Fig. 3.

Each of the blocks shown in the drawings is made of a piece of transparent glass of about three inches in width, six inches in length, and three quarters of an inch in thickness, the bridge which separates the channels in said blocks being about one sixteenth of an inch in thickness.

The object of employing more than one groove in the blocks is to afford means for using two or more thermometers, so that greater accuracy may be obtained the material whose temperature is to be noted lying between said thermometers. The plates or lids F are secured upon the box by a clamp L.

In order that the blocks, and the liquids to be tested contained in their vertical grooves or channels, may be affected as slowly as possible by the temperature of the surrounding atmosphere and that of the hands of the operator, said blocks are placed, when the test is to be made, in a wooden muffle M having a wooden front plate N which is provided with slots or orifices O and R,—the object of the first named orifice being to provide means for the introduction of a spray of chymogene, rigolene, ether, or other refrigerating material, to the block,—the second named orifice being for the observation, by means of a microscope, of the physical condition of the liquid tested.

A slit or orifice D is provided in the back wall of the muffle M, for the admission of light through the block A to a microscope focused opposite the opening R.

The thermometers T are mounted in a metallic, or other suitable frame S, and are supported in said frame by having their smaller ends passed through holes in trip levers Q mounted on said frame, with the result that a vertical and vibratory movement may be given to said thermometers by said levers, and an intimate admixture of the liquid contained in the block be thus obtained, and a flow from one of the grooves of the block to the other be produced.

From the description above given, it will be understood that my device may be employed to observe and note the temperatures at which certain materials appear in crystalline and other solid forms in, and disappear from liquids of various kinds, and that it may also be used to observe and note the effect of various degrees of heat and cold upon organic life. I have employed this device in the testing of oils to determine the temperatures at which, in different oils, paraffine exists in crystalline form, these tests being made by the aid of a microscope and with polarized light.

In making tests of oil, for the purpose stated, its temperature should, by the employment of refrigerating spray, be carried several degrees below the point at which the crystals of paraffine make their appearance, this insures a complete crystallization of the paraffine,—as well as a sufficient cooling of the block and its attached parts to thereafter require the elapse of a considerable period of time for the block to gain a sufficient temperature to produce the disappearance of said crystals. In testing liquids containing materials which crystallize at comparatively high temperatures, a refrigerating mixture of salt and ice may be employed In the use of my device for testing materials which, at ordinary temperatures, are in liquid form, the testing block, and its contained liquid, are, by a proper refrigerating process, reduced to a temperature at which said material assumes a solid form. In testing materials which, at ordinary temperatures, exist in solid form, the block and its contained solid material are subjected to a sufficient degree of heat to reduce said material to a liquid form. Care should be taken to raise the temperature of the liquefied solid to a point beyond that required to liquefy it, and to lower the temperature of the solidified liquid to a point below that necessary to solidify it, so that when the temperature of said liquid, or the temperature of said liquefied solid, returns to the point at which solidification takes place, the glass containing block, and its contained thermometer and liquid, have assumed throughout an even and uniform temperature.

The glass block in which the material tested is contained is to be coated upon its outer surface with glycerine for preventing the formation thereon of haze or frost.

Having thus described my invention, I claim:

1. A device in which to determine the physical condition of oil and other liquids, at given temperatures, which consists in a transparent glass block, provided with two or more bores in proximity to each other, having a partition of glass between them, and provided with a lid, one of the faces of which is plain and the other of which is provided with a transverse slot or channel adapted to form a passage between said bores, as and for the purpose specified.

2. A device in which to determine the physical condition of liquids, or liquefied solids, at given temperatures, which consists in a transparent glass block provided with two or more bores parallel and in proximity to each other, having a partition of glass between them, and provided with a duct or channel leading from one of said bores to the other and provided with a lid, in combination with a thermometer located within each of said bores, as and for the purpose specified.

In testimony whereof I have hereunto signed my name this 15th day of July, A. D. 1887.

GEORGE H. PERKINS.

In presence of—
WM. C. STRAWBRIDGE,
J. BONSALL TAYLOR.